US012707289B2

(12) United States Patent
Williams et al.

(10) Patent No.: US 12,707,289 B2
(45) Date of Patent: Aug. 11, 2026

(54) WIRELESS RADIO THERMAL MANAGEMENT

(71) Applicant: ARRIS Enterprises LLC, Suwanee, GA (US)

(72) Inventors: David J. Williams, Cumming, GA (US); Joshua S. Brookshire, Hoschton, GA (US)

(73) Assignee: ARRIS Enterprises LLC, Horsham, PA (US)

( * ) Notice: Subject to any disclaimer, the term of this patent is extended or adjusted under 35 U.S.C. 154(b) by 388 days.

(21) Appl. No.: 18/141,566

(22) Filed: May 1, 2023

(65) Prior Publication Data

US 2023/0362679 A1 Nov. 9, 2023

Related U.S. Application Data

(60) Provisional application No. 63/338,963, filed on May 6, 2022.

(51) Int. Cl.

*H04W 24/02* (2009.01)
*H04W 28/08* (2023.01)
*H04W 52/28* (2009.01)

(52) U.S. Cl.

CPC ....... *H04W 24/02* (2013.01); *H04W 28/0958* (2020.05); *H04W 52/28* (2013.01)

(58) Field of Classification Search

CPC . H04W 24/02; H04W 28/0958; H04W 52/28; H04W 88/10
USPC .......................................................... 370/328
See application file for complete search history.

(56) References Cited

U.S. PATENT DOCUMENTS

| | | | | |
|---|---|---|---|---|
| 10,509,450 | B1 * | 12/2019 | Sun | G06F 1/20 |
| 11,226,663 | B2 * | 1/2022 | Guy | G06F 1/3209 |
| 2010/0091691 | A1 * | 4/2010 | Dorsey | H04W 52/0251 370/311 |
| 2019/0041926 | A1 | 2/2019 | Guy et al. | |
| 2019/0123787 | A1 | 4/2019 | Seol et al. | |
| 2020/0367176 | A1 * | 11/2020 | Lee | G06F 1/3287 |
| 2020/0387204 | A1 | 12/2020 | McFarland et al. | |

(Continued)

OTHER PUBLICATIONS

International Search Report and Written Opinion issued Aug. 18, 2023 in International Application No. PCT/US2023/020537.

(Continued)

*Primary Examiner* — Kwang B Yao
*Assistant Examiner* — Syed M Bokhari
(74) *Attorney, Agent, or Firm* — Chernoff, Vilhauer, McClung & Stenzel, LLP

(57) ABSTRACT

A thermal management controller can be used to alter an operation associated with a network device when a temperature associated with a radio of the network device increases beyond a temperature threshold. A threshold is associated with a state of a plurality of states of the network device. As the temperature increases the thermal management controller to determine whether a current temperature exceeds a temperature threshold associated with the current state of the network device. Based on the determination, the thermal management controller can alter an operation based on the current state and an outcome of the determination. Altering the operation can cause the current temperature to decrease so that the network device can revert to a previous state, for example, a normal or default operation.

20 Claims, 5 Drawing Sheets

(56) References Cited

U.S. PATENT DOCUMENTS

| | | | | |
|---|---|---|---|---|
| 2021/0258804 | A1 | 8/2021 | Amini et al. | |
| 2022/0070687 | A1 | 3/2022 | Raghavan et al. | |
| 2022/0322339 | A1* | 10/2022 | Park | G06F 1/3278 |
| 2023/0280716 | A1* | 9/2023 | Kotak | G06F 11/3058 700/300 |
| 2024/0187883 | A1* | 6/2024 | Ali | H04W 24/02 |

OTHER PUBLICATIONS

International Preliminary Report on Patentability dated Nov. 7, 2024 in International (PCT) Application No. PCT/US2023/020537.

* cited by examiner

WIRELESS RADIO THERMAL MANAGEMENT

BACKGROUND

Generally, various network devices of network can include multiple radios and associated interfaces so as to provide a robust user experience, for example, so as to support transmission of data in the 2.4 Giga Hertz (GHz) frequency band, 5 GHz frequency band, 6 GHz frequency band, etc. However, increasingly, network devices have a small form factor which impedes essential thermal dissipation. Without proper thermal management, temperatures associated with such network devices can increase and affect the proper operation of the network device or even damage internal components of the network device. Thus, there is a need for improved thermal management of wireless radios of network devices so as to improve performance of network devices.

SUMMARY

According to some aspects of the present disclosure there are provided novel solutions for providing thermal management of one or more wireless radios of a network device, for example, an access point device. A wireless radio operates at any of a frequency, such as a 2.4 GHz frequency band, a 5 GHz frequency band, 6 GHz frequency band, any other frequency band, or any combination thereof. Operation of the wireless radio can increase a temperature associated with the network device, such as any of the ambient temperature, the surface temperature, the internal temperature, or any combination thereof. An increase in the temperature can adversely affect the network device. For example, temperature can adversely affect the network device by causing any of a failure of one or more components of the network device, a degradation in performance, a malfunction, a shutting down, any other adverse effect, or any combination thereof. A thermal management controller can monitor the temperature associated with a network device so as to detect when the temperature is at or exceeds a temperature threshold. Associating a temperature threshold with each state of a plurality of states of the network device provides for the effective thermal management of the network device as the thermal management controller can alter an operation of the network device based on the current state of the plurality of states. In this way, thermal management of the network device prevents, for example, a sudden shut-down or other adverse effect of the network device.

An aspect of the present disclosure provides a network device. The network device comprises one or more radios, a memory storing one or more computer-readable instructions and a processor. The processor is configured to execute the one or more computer-readable instructions to determine a current temperature associated with the network device based on one or more temperature measurements associated with the one or more radios, determine a thermal indicator, wherein determining the thermal indicator comprises comparing the current temperature to a temperature threshold associated with a current state of a plurality of states of the network device, determine a new state of the plurality of states based on the thermal indicator and the current state, and alter an operation associated with the network device based on the new state and the thermal indicator.

In an aspect of the present disclosure, the processor is further configured to execute the one or more computer-readable instructions to determine the current temperature based on one or more additional temperature measurements, update the current state based on the new state, determine the thermal indicator, wherein determining the thermal indicator comprises comparing the current temperature to a subsequent temperature threshold associated with the current state, determine the new state based on the thermal indicator and the current state, and alter a subsequent operation associated with the network device based on the new state and the thermal indicator.

In an aspect of the present disclosure, the altering the operation comprises reducing a transmit duty cycle associated with at least one of the one or more radios.

In an aspect of the present disclosure, altering the operation comprises capping a transmit power for at least one of the one or more radios.

In an aspect of the present disclosure, altering the operation comprises reducing a number of radio frequency (RF) chains associated with at least one of the one or more radios.

In an aspect of the present disclosure, altering the operation comprises redirecting at least one of one or more network devices connected to the one or more radios to a different radio of the one or more radios or a different network device.

In an aspect of the present disclosure, altering the operation comprises shutting down an interface associated with at least one of the one or more radios.

An aspect of the present disclosure provides a method for thermal management of a network device. The method comprises determining a current temperature associated with the network device based on one or more temperature measurements associated with the one or more radios, determining a thermal indicator, wherein determining the thermal indicator comprises comparing the current temperature to a temperature threshold associated with a current state of a plurality of states of the network device, determining a new state of the plurality of states based on the thermal indicator and the current state, and altering an operation associated with the network device based on the new state and the thermal indicator.

In an aspect of the present disclosure, the method further comprises determining the current temperature based on one or more additional temperature measurements, updating the current state based on the new state, determining the thermal indicator, wherein determining the thermal indicator comprises comparing the current temperature to a subsequent temperature threshold associated with the current state, determining the new state based on the thermal indicator and the current state, and altering a subsequent operation associated with the network device based on the new state and the thermal indicator.

In an aspect of the present disclosure, the method is such that altering the operation comprises reducing a transmit duty cycle associated with at least one of the one or more radios.

In an aspect of the present disclosure, the method is such that altering the operation comprises capping a transmit power for at least one of the one or more radios.

In an aspect of the present disclosure, the method is such that altering the operation comprises reducing a number of radio frequency (RF) chains associated with at least one of the one or more radios.

In an aspect of the present disclosure, the method is such that altering the operation comprises redirecting at least one of one or more network devices connected to the one or more radios to a different radio of the one or more radios or a different network device.

In an aspect of the present disclosure, the method is such that altering the operation comprises shutting down an interface associated with at least one of the one or more radios.

An aspect of the present disclosure provides a non-transitory computer-readable medium of an access point device storing one or more instructions. The one or more instructions when executed by a processor of the access point device, cause the access point device to perform one or more operations including any one or more of the steps of the methods described above

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples and not for the purpose of limiting the present disclosure as defined by the appended claims and their equivalents. The words and phrases used in the following description and claims are merely used to enable a clear and consistent understanding of the present disclosure. In addition, descriptions of well-known structures, functions, and configurations may be omitted for clarity and conciseness. Those of ordinary skill in the art will recognize that various changes and modifications of the examples described herein can be made without departing from the spirit and scope of the present disclosure.

Figure 1:
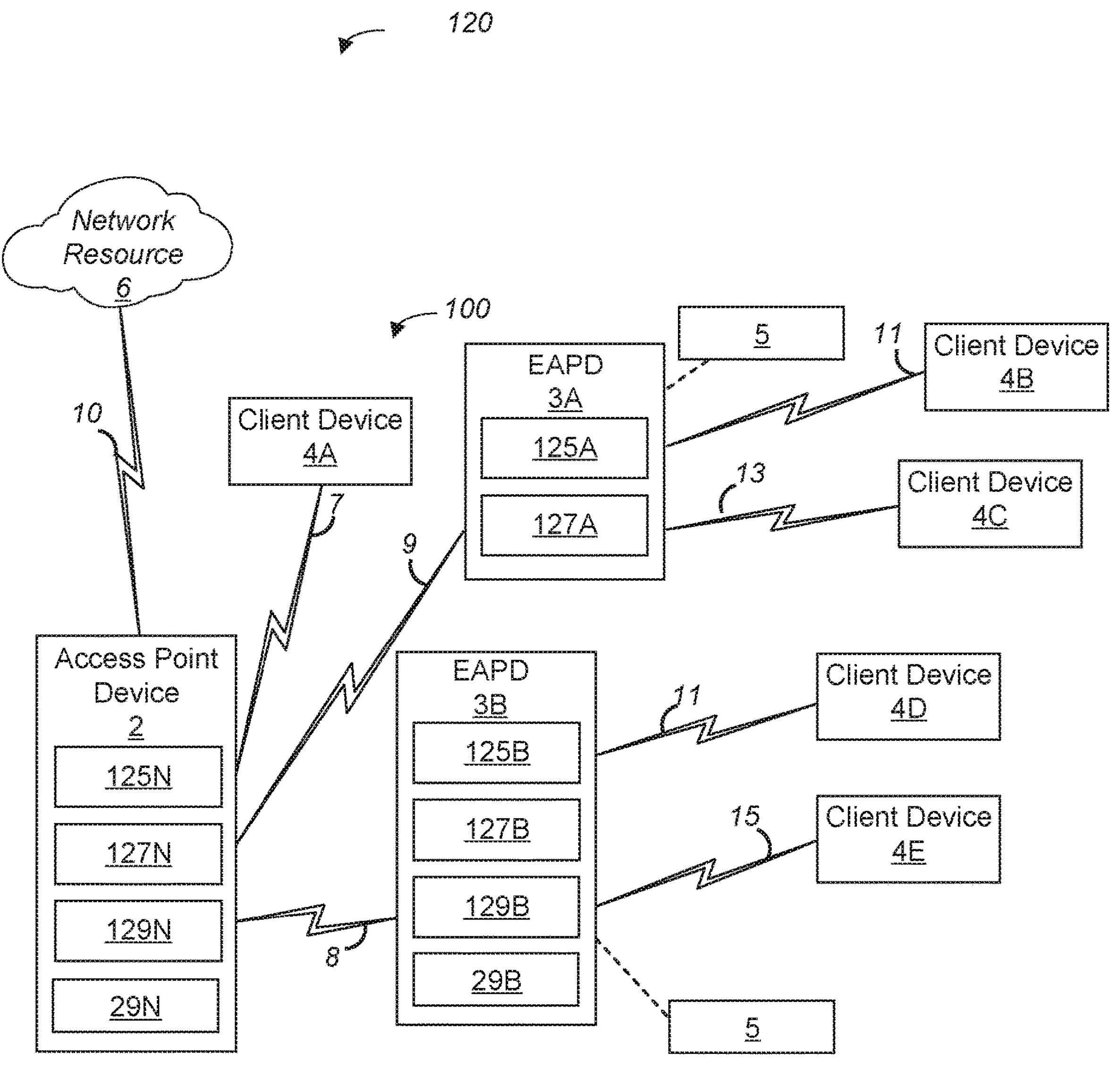
FIG. 1 is a schematic diagram of a thermal management system, according to one or more aspects of the present disclosure.

FIG. 1 is a schematic diagram of a thermal management system 100 of a network environment 120, according to one or more aspects of the present disclosure. It should be appreciated that various example embodiments of inventive concepts disclosed herein are not limited to specific numbers or combinations of network devices, and there may be one or multiple of some of the aforementioned network devices in the system, which may itself consist of multiple communication networks and various known or future developed wireless connectivity technologies, protocols, devices, and the like.

The thermal management system 100 includes one or more network devices, such as an access point device (APD) 2 connected to a network resource 6, for example, an Internet Service Provider, the Internet, a repository, a web page, a server, a network service, any other network resource, or any combination thereof, one or more wireless devices (for example, one or more extender access point devices (EAPD) 3 (for example, EAPD 3A and EAPD 3B, collectively referred to as extender access point device(s) 3) and/or one or more client devices 4 (for example, client devices 4A-4E, collectively referred to as client device(s) 4)) that may be connected in one or more wireless networks (for example, a private network, a guest network, an iControl, a backhaul network, or an Internet of things (IoT) network), any other network devices, or any combination thereof. In one or more embodiments, a network device is any device that includes one or more radios. One or more network devices could be located in more than one network. For example, the wireless extender access point devices 3 could be located both in a private network for providing content and information to a client device 4 and also included in a backhaul network or an iControl network. One or more network devices, such as extender access point devices 3A and 3B, can be connected to one or more sensing devices 5, such as a temperature sensor, a thermal indicator, or any other device that provides one or more temperature measurements. In one or more embodiments, one or more sensing devices 5 can be internal to or external to any one or more network devices, including, but not limited to, the one or more extender access point devices 3.

The access point device 2 can be, for example, a hardware electronic device that may be a combination modem and network gateway device that combines the functions of a modem, an access point (AP), a gateway, a residential gateway (RG), a broadband access gateway, a home network gateway, a router, a home router, an extender access point device 3, any other network devices that comprises a thermal management controller 29 (including, but not limited to, a home network controller (HNC), such as thermal management controller 29N, 29A, and 29B, collectively referred to as thermal management controller 29), or any combination thereof. It is also contemplated by the present disclosure that the access point device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The thermal management controller 29 can provide an improved network performance by monitoring the temperature associated with a network device and altering an operation of the network device based on the temperature and an associated state of a plurality of states so as to provide thermal management, according to one or more aspects of the present disclosure.

The access point device 2 can include one or more wireless interfaces, including but not limited to, one or more radios such as a 2.4 GHz radio 125N, a 5 GHz radio 127N, and a 6 GHz radio 129N. While FIG. 1 illustrates various radios collectively referred to as radios 125, 127, and 129, the present disclosure contemplates that any network device can comprise any number of radios at any given frequency, such as a 60 GHz radio.

The connections 7, 8 and 9 between the access point device 2 and the one or more extender access point devices 3 and/or one or more client devices 4 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizen broadband radio services (CBRS) band, 2.4 GHz frequency bands, 5 GHz frequency bands, 6 GHz frequency bands, 60 GHz frequency bands, any other bands, or any combination thereof. In one or more embodiments, any of connections 7, 8 and 9 can be a wired connection.

The connections 8 and 9 between the access point device 2 and one or more extender access point devices 3 can be implemented using any radio of the access point device 2 and any radio of the extender access point device 3. For example, the access point device 2 can utilize a radio 127N to establish a connection 9 to a radio 127A of an extender access point device 3A and a radio 129N to establish a connection 8 to a radio 129B of extender access point device 3B.

The connections 7, 8, 9, and 10 between the access point device 2, the network resource 6, the one or more extender access point devices 3, and the one or more client devices 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz frequency bands, 5 GHz frequency bands, 6 GHz frequency bands, or 60 GHz frequency bands. Additionally, any one or more connections can be implemented using a wireless connection that operates in accordance with, but is not limited to, RF4CE protocol, ZigBee protocol, Z-Wave protocol, or IEEE 802.15.4 protocol. It is also contemplated by the present disclosure that any one or more connections can include connections to a media over coax (MoCA) network.

The thermal management system 100 can include one or more extender access point devices 3, for example, extender access point devices 3A and 3B. An extender access point device 3 can comprise one or more radios, for example, a 2.4 GHz radio 125 (such as radios 125A and of extender access point devices 3A and 3B, respectively), a 5 GHz radio 127 (such as radios 127A and 127B of extender access point devices 3A and 3B, respectively), a 6 GHz radio 129 (such as radio 129B of extender access point device 3B), any other radio, or any combination thereof. In one or more embodiments, an extender access point device can be connected to another extender access point device via any one or more radios. For example, the one or more extender access point devices 3 can be hardware electronic devices such as access points used to extend the wireless network by receiving the signals transmitted by the access point device 2 and rebroadcasting the signals to, for example, one or more client devices 4, which may be out of range of the access point device 2 or one or more extender access point devices 3. The one or more extender access point devices 3 can also receive signals from the one or more client devices 4 and rebroadcast the signals to the access point device 2 and/or other client devices 4. The extender access point device 3B can comprise a thermal management controller 29B for thermal management as discussed above.

The connections 11, 13 and 15 between respective extender access point devices 3 and one or more client devices 4 is implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz frequency bands, 5 GHz frequency bands, 6 GHz frequency bands, or 60 GHz frequency bands. One or more of these connections can also be a wired Ethernet connection.

The connection 8 between respective extender access point devices 3 can be implemented using the 6 GHz radio 129B of a wireless extender 3B, for example. The connection 8 enables the wireless extender 3B to establish a dedicated 6 GHz wireless backhaul (BH) according to example embodiments of the present disclosure. For example, a radio 129B of an extender access point device 3B and radio 129N of access point device 2 can be utilized to establish a wireless BH. However, the connection 8 could also be implemented using respective wired interfaces (such as Ethernet, cable, fiber optic, or the like) in some alternative example embodiments.

The thermal management system 100 can include one or more client devices 4, for example, client devices 4A, 4B, 4C, 4D, and 4E. A client device 4 can include a radio such as any of the radios discussed above with respect to access point device 2 and/or extender access point device 3. The client devices 4 can be, for example, hand-held computing devices, personal computers, electronic tablets, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the access point device 2. Additionally, the client devices 4 can be a television (TV), an IP/QAM set-top box (STB) or a streaming media decoder (SMD) that is capable of decoding audio/video content, and playing over OTT or MSO provided content received through the access point device 2.

The connection 7 between the access point device 2 and the client device 4A can be implemented through a wireless connection that operates in accordance with, but is not limited to, any IEEE 802.11 protocols. Additionally, the connection 7 between the access point device 2 and the client device 4A can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G, etc. network, for example. The connection 7 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz frequency bands, 5 GHz frequency bands, 6 GHz frequency bands, or 60 frequency GHz bands.

Figure 2:
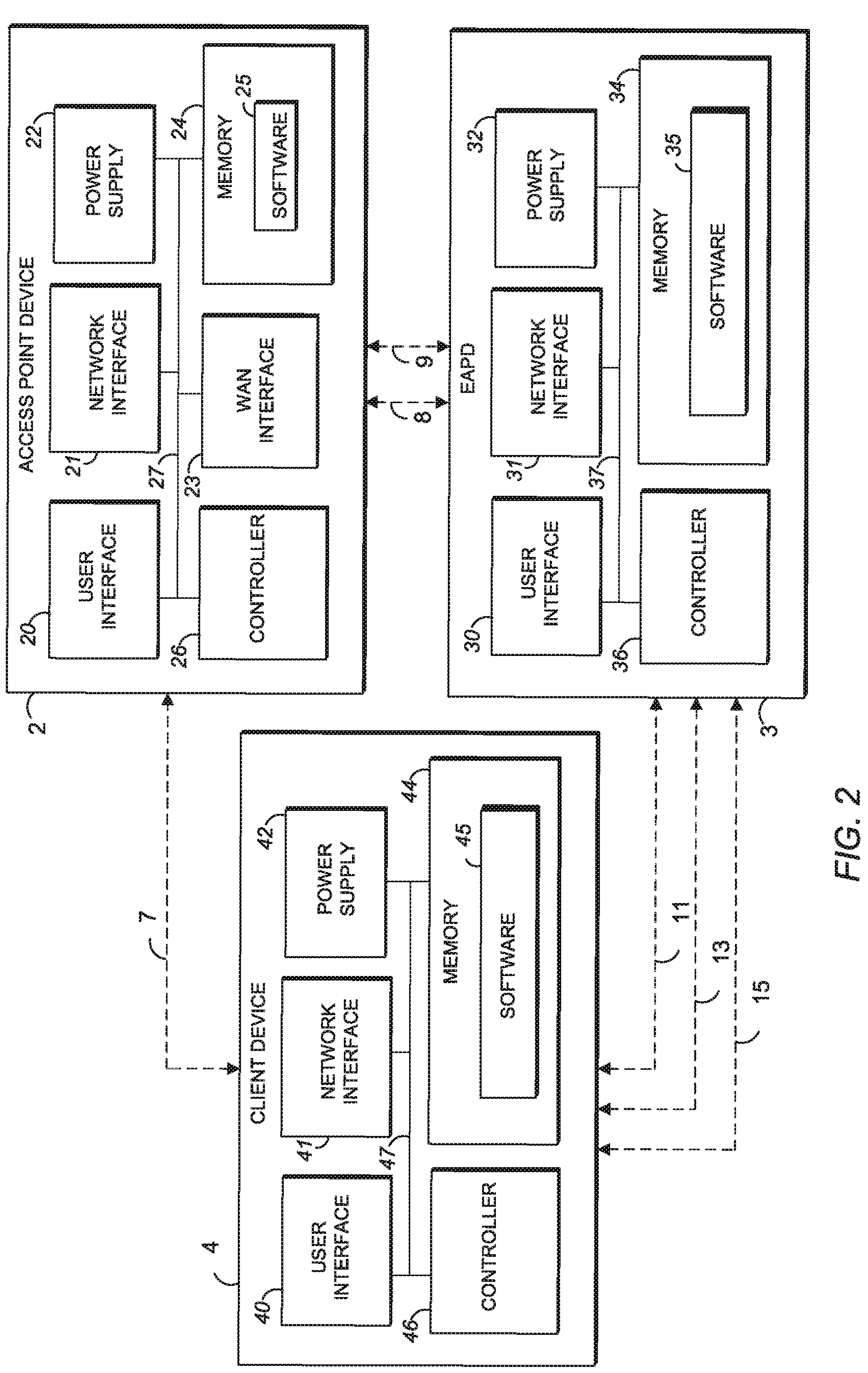
FIG. 2 is a more detailed block diagram illustrating various components of a network environment of FIG. 1, according to one or more aspects of the present disclosure.

A more detailed description of the exemplary internal components of the gateway device 2, the wireless extenders 3, and the client devices 4 shown in FIG. 1 will be provided in the discussion of FIG. 2. However, in general, it is contemplated by the present disclosure that the access point device 2, the extender access point device 3, and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium (for example, a non-transitory computer-readable medium).

Further, any, all, or some of the computing components in the access point device 2, the extender access point devices 3, and the client devices 4, may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, and the client devices 4 are further equipped with components to facilitate communication with other computing devices over the one or more network connections to local and wide area networks, wireless and wired networks, public and private networks, and any other communication network enabling communication in the system.

FIG. 2 is a more detailed block diagram illustrating various components of a thermal management system 100, according to one or more aspects of the present disclosure.

Although FIG. 2 only shows one extender access point device 3 and one client device 4, the extender access point device 3 and the client device 4 shown in the figure are meant to be representative of the other extender access point device 3 and client devices 4 shown in FIG. 1. Similarly, the connections 7, 8, 9, 11, 13, and 15 between the access point device 2, the wireless extender 3, and the client device 4 shown in FIG. 2 are meant to be exemplary connections and are not meant to indicate all possible connections between the gateway devices 2, extender access point devices 3, and client devices 4. Additionally, it is contemplated by the present disclosure that the number of access point devices 2, extender access point devices 3, and client devices 4 is not limited to the number of access point devices 2, extender access point devices 3, and client devices 4 shown in FIGS. 1 and 2.

Now referring to FIG. 2 (for example, from left to right), the client device 4 can be, for example, a computer, a portable device, an electronic tablet, an e-reader, a PDA, a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the access point device 2. Additionally, the client device 4 can be a TV, an IP/QAM STB, or an SMD that is capable of decoding audio/video content, and playing over OTT or MSO provided content received through the access point device 2.

As shown in FIG. 2, the client device 4 includes a user interface 40, a network interface 41, a power supply 42, a memory 44, and a local controller 46. The user interface 40 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities to allow interaction between a user and the client device 4. The network interface 41 can include, but is not limited to, various network cards, interfaces, and circuitry implemented in software and/or hardware to enable communications with the access point device 2 and the extender access point device 3 using the communication protocols in accordance with connections 7, 11, 13, and 15 (for example, as described with reference to FIG. 1). The network interface 41 can include multiple radios (for example, a 2.4 GHz radio, a 5 GHz radio, a 6 GHz radio, a 60 GHz radio, any other radio, or any combination thereof), which may also be referred to as wireless local area network (WLAN) interfaces. Any one or more of the radios can provide a fronthaul (FH) connection between the client device(s) 4 and the access point device 2 and/or the extender access point device 3.

The power supply 42 supplies power to the internal components of the client device 4 through the internal bus 47. The power supply 42 can be a self-contained power source such as a battery pack with an interface to be powered through an electrical charger connected to an outlet (for example, either directly or by way of another device). The power supply 42 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The memory 44 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 44 can be used to store any type of instructions, software, or algorithms including software 45 for controlling the general function and operations of the client device 4 in accordance with the embodiments described in the present disclosure.

The local controller 46 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 45 for controlling the operation and functions of the client device 4 in accordance with the embodiments described in the present disclosure. Communication between the components (for example, 40, 41, 42, 44, 46) of the client device 4 may be established using an internal bus 47.

The extender access point device 3 can be, for example, a hardware electronic device such as an access point used to extend a wireless network by receiving the signals transmitted by the access point device 2 and rebroadcasting the signals to client devices 4, which may be out of range of the access point device 2. The extender access point device 3 can also receive signals from the client devices 4 and rebroadcast the signals to the access point device 2 or other client devices 4.

As shown in FIG. 2, the extender access point device 3 includes a user interface 30, a network interface 31, a power supply 32, a memory 34, and a local controller 36. The user interface 30 can include, but is not limited to, push buttons, a keyboard, a keypad, an LCD, a TFT, an LED, an HD or other similar display device including a display device having touch screen capabilities so as to allow interaction between a user and the wireless extender 3. The network interface 31 can include various network cards, interfaces, and circuitry implemented in software and/or hardware to enable communications with the client device 4 and the access point device 2 using the communication protocols in accordance with connections 11, 13, 15 and 7 (for example, as described with reference to FIG. 1). For example, the network interface 31 can include multiple radios or sets of radios (for example, a 2.4 GHz radio, a 5 GHz radio, a 6 GHz radio, a 60 GHz radio, any other radio, or any combination thereof), which may also be referred to as wireless local area network (WLAN) interfaces. One radio or set of radios provides a backhaul (BH) connection between the extender access point device 3 and the access point device 2, and optionally other extender access point device(s) 3. Another radio or set of radios provides a fronthaul (FH) connection between the extender access point device 3 and one or more client device(s) 4.

The power supply 32 supplies power to the internal components of the wireless extender 3 through the internal bus 37. The power supply 32 can be connected to an electrical outlet (for example, either directly or by way of another device) via a cable or wire. The memory 34 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 34 can be used to store any type of instructions, software, or algorithm including software 35 for controlling the general functions and operations of the extender access point device 3 and performing thermal management functions for the network device in accordance with the embodiments described in the present disclosure. In one or more embodiments, a thermal management controller 29A and/or 29B is hardware, such as a controller 26, software 25, or both.

The local controller 36 controls the general operations of the extender access point device 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software including the software 35 for controlling the operation and functions of the extender access point device 3 in accordance with the embodiments described in the present disclosure. General communication between the components (for example, 30, 31, 32, 34, 36) of the extender access point device 3 may be established using the internal bus 37.

The access point device 2 can be, for example, a hardware electronic device that can combine the functions of a modem, an access point (AP), and/or a router for providing content received from the content provider (ISP) 1 to network devices (for example, extender access point device 3, client devices 4) in the system. It is also contemplated by the present disclosure that the access point device 2 can include the function of, but is not limited to, an IP/QAM STB or SMD that is capable of decoding audio/video content, and playing OTT or MSO provided content.

As shown in FIG. 2, the access point device 2 includes a user interface 20, a network interface 21, a power supply 22, a wide area network (WAN) interface 23, and a memory 24. The user interface 20 can include, but is not limited to, push buttons, a keyboard, a keypad, an LCD, a TFT, an LED, an HD or other similar display device including a display device having touch screen capabilities so as to allow interaction between a user and the gateway device 2. The network interface 21 may include various network cards, and circuitry implemented in software and/or hardware to enable communications with the extender access point device 3 and the client device 4 using the communication protocols in accordance with connections 7, 8, 9, 11, 13, and/or 15 (for example, as described with reference to FIG. 1). For example, the network interface 21 can include an Ethernet port (also referred to as a LAN interface) and multiple radios or sets of radios (for example, a 2.4 GHz radio, a 5 GHz radio, a 6 GHz radio, a 60 GHz radio, any other radio or any combination thereof also referred to as WLAN interfaces). One radio or set of radios can provide a wireless backhaul (BH) connection between the access point device 2 and the extender access point device(s) 3. Another radio or set of radios can provide a fronthaul (FH) connection between the access point device 2 and one or more client device(s) 4.

The power supply 22 supplies power to the internal components of the access point device 2 through the internal bus 27. The power supply 22 can be connected to an electrical outlet (for example, either directly or by way of another device) via a cable or wire. The WAN interface 23 may include various network cards, and circuitry implemented in software and/or hardware to enable communications between the access point device 2 and the network resource 6 using the wired and/or wireless protocols in accordance with connection 10 (for example, as described with reference to FIG. 1). For example, the WAN interface 23 can include an Ethernet port and one or more radios (for example, a 6 GHz radio). The WAN interface 23 (for example, a 6 GHz radio) may be used to provide a wireless backhaul (BH) connection between the access point device 2 and any one or more other elements, according to example embodiments of the present disclosure. However, the WAN interface 23 could provide a wired Ethernet connection (for example, a BH connection) between the access point device 2 and any other element according to some alternative example embodiments.

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software 25 for controlling the general functions and operations of the access point device 2 and performing thermal management functions for the network device in accordance with the embodiments described in the present disclosure. In one or more embodiments, the thermal management controller 29N is hardware, such as a controller 26, software 25, or both. The memory 24 can store data for one or more states associated with an operation of the network device, such as a state, a corresponding temperature or range of temperatures, and/or a corresponding operation. For example, a state can be associated with a temperature or a range of temperatures.

The controller 26 controls the general operations of the access point device 2 as well as performs management functions related to the other devices (for example, extender access point device 3 and client device 4) in the network. The steering controller 26 can include, but is not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software including the software 25 for controlling the operation and functions of the access point device 2 in accordance with the embodiments described in the present disclosure. Communication between the components (for example, 20, 21, 22, 23, 24, 26) of the access point device 2 may be established using the internal bus 27. The controller 26 may also be referred to as a processor, generally.

Figure 3:
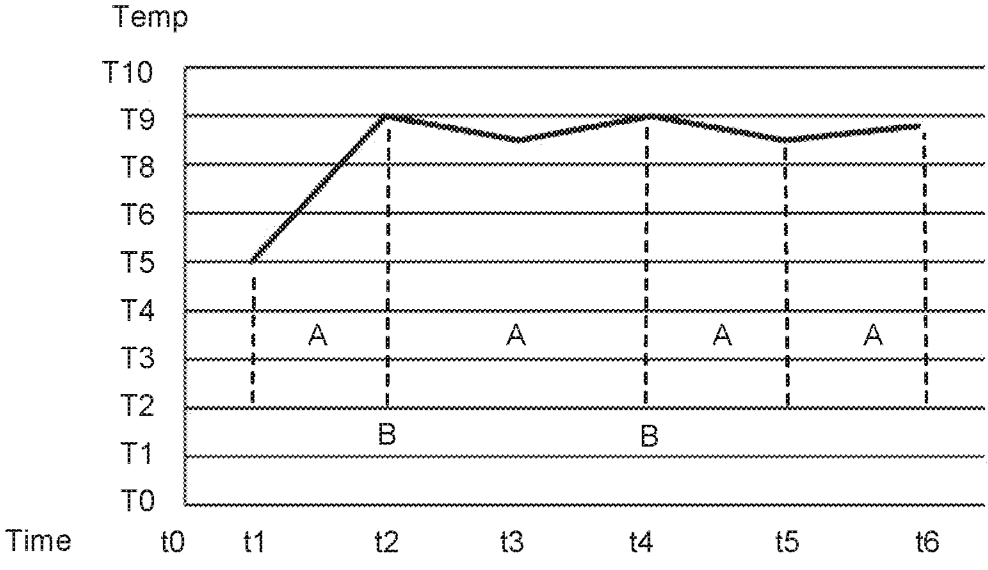
FIG. 3 is a graph illustrating thermal management of a network device, according to one or more aspects of the present disclosure.

FIG. 3 is a graph illustrating thermal management of a network device within a network environment 120, according to one or more aspects of the present disclosure. The diagram illustrates time (Time, for example time t0-t6) on the x-axis and a corresponding temperature (Temp) along the y-axis. The thermal management controller can determine a temperature, such as a current temperature (such as T0-T9) at a time (such as t0-t6) based on any of a time period (such as periodically), a timed interval, a semaphore, an alarm, a timer, any other time mechanism, or any combination thereof. The thermal management controller can receive one or more temperature measurements, for example, from a temperature sensor associated with a radio and/or any other temperature sensor internal to or external to the network device for use in determining whether to alter an operation of the network device.

The thermal management controller can maintain, identify or otherwise determine a state of a plurality of states of the network device, for example, a current state based on a current operation of the network device and/or a previously stored state. The thermal management controller can store in a memory (such as a memory 24) of the network device state information associated with thermal management of the network device, such as one or more parameters associated with a current state, an associated temperature threshold (T_Th), an associated operation, a next state associated with the current state, any other information, or any combination thereof, for example, as illustrated in TABLE 1. The state information can be used along with the identified current state to determine whether an operation of the network devices needs to be altered for thermal management. One or more operations of the network device can be altered by the thermal management controller based on the current temperature, the identified current state and the corresponding state information, for example, of TABLE 1.

For example, a thermal indicator (T_Ind) can be determined by comparing a current temperature associated with the network device to a temperature threshold associated with the current state of the network device. The current temperature (Tc) can be determined, for example, based on one or more temperature measurements received from one or more temperature sensors, for example, one or more temperature sensors associated with one or more radios of the network device. The next state can then be determined based on the temperature indicator and the current state. The one or more operations can comprise any of one or more parameters associated with a radio of the network device (such as any of a reduce data rate, change a data mode, reduce an output or transmit power, reduce a duty cycle, limit a radio frequency (RF) chain, any other parameter associated with the radio, or any combination thereof), a client connection (for example, one or more clients associated with a radio can be disconnected, removed, or otherwise blocked from the radio), a radio interface support (for example, one or more radio interfaces of a radio can be shut down or otherwise disconnected from a power source), any other operation, or any combination thereof. An operation can be associated with a time period such that at expiration of the time period the operation is any of discontinued, toggled, maintained until subsequent determinations are made, such as one or more additional temperature measurements received are compared to a temperature threshold associated with the current state, or any combination thereof.

TABLE 1

| Current State | T_Th (Celsius) | Operation | Next State ($T_C$ > T_Th) (e.g., T_Ind = 1) | Previous State ($T_C$ ≤ T_Th) (e.g., T_Ind = 0) |
|---|---|---|---|---|
| A (first state) | 25 | <Null> (or default operation) | B | A |
| B (second state) | 25-32 | Reduce transmit duty cycle | C | A |
| C (third state) | 32 | Cap radio transmit power | D | B |
| D (fourth state) | 37 | Limit number of RF chains | E | C |
| E (fifth state) | 43 | Remove client device(s) connected to a radio | F | D |
| F (sixth state) | 46 | Shut-Down a radio interface | F or Shut-Down Network Device | E |

As an example, TABLE 1 illustrates corresponding state information for a current state of the network device, such as a temperature threshold, an operation, a next state, and a previous state. In one or more embodiments, TABLE 1 can be stored locally at the network device or remotely from the network device, such as at a network resource. The current state of the network device can be retrieved from a storage location, such as a memory (whether remote from or local to the network device) or determined as needed. While TABLE 1 illustrates six states, the present invention contemplates that any number of states can be associated with a network device. For ease of reference, the states in TABLE 1 are denoted by ordinal states and/or characters but the present disclosure contemplates any naming convention for the plurality of states.

Each state of the plurality of states can be associated with a temperature threshold. The temperature threshold can be a range of temperatures (such as $25<T\_TH<32$ as illustrated for state B), a value (such as T_TH=25 as illustrated for states A and C-F), or both. In one or more embodiments, a temperature threshold can be expressed such that a thermal indicator is determined based on a comparison of the thermal indicator to the temperature threshold. The comparison can comprise determining that the thermal indicator is at or exceeds or is at or below a temperature threshold associated with a state. While the temperature threshold in TABLE 1 is expressed in degrees Celsius, the present disclosure contemplates any unit of measurement or representation thereof, for example, any of Celsius, Fahrenheit, Kelvin, a correlation to any unit of measurement, or any combination thereof.

Each state of the plurality of states is associated with an operation of the network device. The operation corresponds to an action that can be taken by the thermal management controller to manage the temperature of the network device, for example, temperature based on the functioning of one or more radios of the network device. The normal operating state of the network device (a default operation) can be indicated by a <NULL> value or other value indicative of a normal or default operation of the network device. This normal or default operation is indicated as a first state, state “A”, in TABLE 1. For example, when the network device is operating within an acceptable temperature threshold comprising a range and/or at or below a temperature threshold, the thermal management controller does not alter any operation of the network device or in general, maintains the normal or default operation of the network device. While only a single operation is illustrated in TABLE 1 for each state, the present disclosure contemplates any number of operations can be associated with a state. Any one or more operations can be associated with a time interval or time period such that altering the operation associated with the network device is for a limited period of time. Each operation can correspond to one or more radios or one or more other components/elements of the network device. For example, the thermal management controller can determine to alter an operation, such as to limit or reduce the transmit duty cycle, and can select a single radio or a plurality of radios to which to alter the operation. In one or more embodiments, the thermal management controller can identify a single radio and alter the operation of the single radio and then subsequently identify one or more other radios and alter the operation of the one or more other radios. In this way, the thermal management controller can independently alter the operation of any radio of the network device.

The thermal management controller can determine a next state of the network device based on the current state and a determination of a thermal indicator (T_TI). As indicated in TABLE 1, the next state can be different based on the thermal indicator, such as when Tc>T_Th, the thermal management controller can alter operation of the network device based on an operation associated with a next state and when Tc≤T_Th, the thermal management controller can alter operation of the network device based on a pervious state. For example, if the current state is state B and Tc>T_Th, the thermal management controller can alter the operation of the network device by capping radio transmit power of a radio as indicated by the next state (second state, state “C”) and if Tc≤T_Th the thermal management controller can alter the operation of the network device by removing the capping of the radio transmit power of the radio and returning or reverting to the previous state (first state, state “A”). In this way, as the current temperature of the network device fluctuates, the thermal management controller can alter one or more operations of the network device based on the current state and the thermal indicator.

Returning to FIG. 3, the thermal management controller can determine a current temperature at t1, for example, a first temperature T2. The thermal management controller can compare the current temperature T2 to a temperature threshold associated with a current state of the network device, such as a first temperature threshold associated with a first state, state “A”. The first state can indicate a normal operation of the network device such that thermal management is not required, for example, altering an operation of the network device is not required and the default or normal operation of the network device is maintained.

During operation of the network device, the temperature can increase, for example, from T5 at t1 to T9 at t2 due to operation of one or more components/elements of the network device, such as one or more radios. For example, a network device can comprise a plurality of radios operating which can cause an increase in temperature, such as the network device can operate without throttling or power constraints causing an increase in the temperature associated with the network device. The thermal management controller can detect or determine, as a thermal indicator, that the current temperature associated with the network device has exceeded a temperature threshold, for example, a first temperature threshold associated with the first state, state “A”. The thermal management controller determines a next state, such as the second state, state “B”, based on a thermal indicator associated with the current state and alters an operation of the network device based on the next state so as to cause the current temperature to decrease. The thermal management controller updates the current state to the next state (the second state, state “B”). When the thermal indicator associated with the current state, based on the current temperature, is at or below a temperature threshold (a second temperature threshold) associated with the second state, state “B”, the thermal management controller can return or alter an operation of the network device based on the thermal indicator and the previous state (the first state, state “A”). The thermal management controller updates the current state to the previous state (the first state, state “A”). For example, after altering the operation as indicated by the second state, state “B”, the current temperature can fall below T9. The thermal management controller can update the current state to revert to the previous state or the first state, state “A”. The current temperature can oscillate between T8 and T9 from t2 to t4 and the thermal management controller can maintain the operation associated with the first state, state “A”, as the associated thermal indicator does not exceed to the associated temperature threshold. At t4, the current temperature can increase to T9 which triggers the steps discussed above for the duration of t4-t6.

Figure 4:
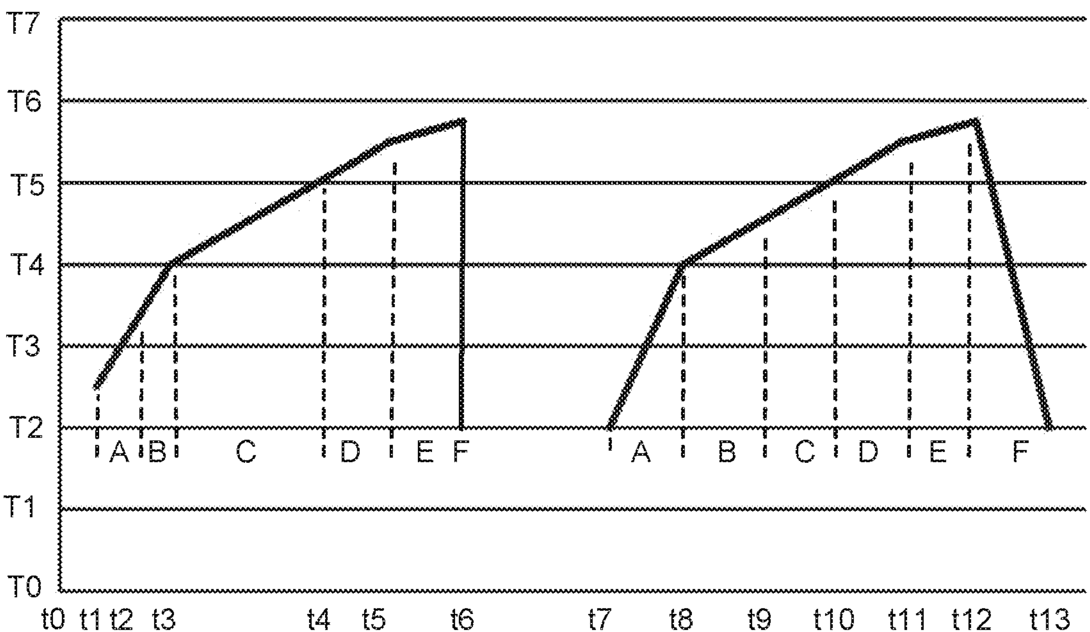
FIG. 4 is a graph illustrating thermal management of a network device, according to one or more aspects of the present disclosure.

FIG. 4 is a graph illustrating thermal management of a network device within a network environment 120, according to one or more aspects of the present disclosure. FIG. 4 illustrates a similar temperature versus time graph as illustrated in FIG. 3, however, in FIG. 4 the thermal management controller transitions between states “A”-“F” at times t0-t13.

In FIG. 4, the network device is operating in a normal or default operation, state “A”. As the temperature increases between t1 and t2, the thermal management controller alters an operation of the network device based on the current state, state “A”. The current state is then state “B”. The temperature again increase between times t2 and t3 and the thermal management controller determines that the next state is state “C” and alters operation of the network device based on state “C”. As illustrated, the thermal management controller transitions between states “C” to “E” as the temperature increases from t3 to t5. At time t6 the temperature reaches a critical point and the thermal management controller alters the operation of the network device associated with state “F”. The thermal management control receives no temperature measurements from the radio while the interface of the radio is shut-down. At time t7, the thermal management controller resumes normal operation of the network device. The temperature again increases from times t7 to t12 and the thermal management controller performs the same cycle through the states as previously discussed ending with state “F” which results in a decrease of temperature from t12 to t13.

Figure 5:
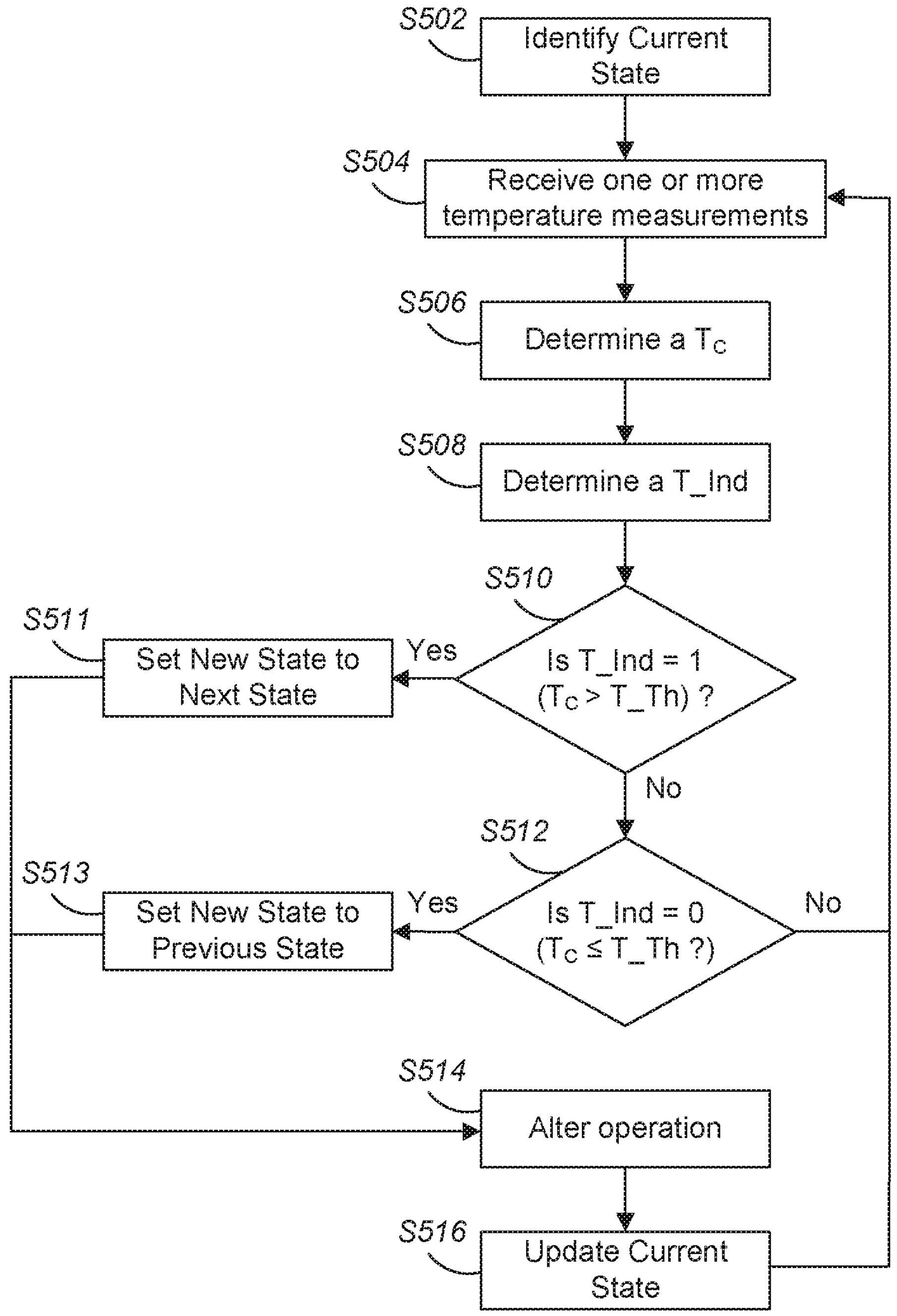
FIG. 5 is a flowchart illustrating a method for thermal management of a network device in a network environment, according to one or more aspects of the present disclosure.

FIG. 5 is a flowchart illustrating a method for thermal management of a network device in a network environment, according to one or more aspects of the present disclosure. At step S502, the network device identifies a current state of the network device, for example, any of states "A"-"F" (first state-sixth state) as discussed with reference to TABLE 1.

At step S504, the network device receives one or more temperature measurements, for example, from any of one or more temperature sensors associated with one or more radios of the network device, a temperature sensor associated with the network device and disposed internally and/or externally to the network device. At step S506, the network device determines a current temperature based on the one or more temperature measurements. For example, the network device can any of determine an average of the one or more temperature measurements, determine a median of the one or more temperature measurements, perform one or more of the steps of the method based on each individual temperature measurement, perform any other temperature determination, or any combination thereof.

At step S506, the network device determines a thermal indicator. The thermal indicator can be determined based on a comparison of the current temperature to a threshold associated with the current state as shown in steps S510 and S512. In one or more embodiments, the thermal indicator can be a value indicative of the comparison of steps S510 and S512, such as a binary "1" or "0". In one or more embodiments steps S508-S512 can be implemented with the thermal indicator indicative of the mathematical result of S510 and S512, such as part of an if/then statement.

At step S510, if the thermal indicator indicates the current temperature is greater than a thermal threshold associated with the current state, the method continues to S511 where a new state is set to a next state based on the current state and the thermal indicator, for example, as indicated by TABLE 1. If the thermal indicator indicates the current temperature is less than or equal to a temperature threshold associated with the current state, the method continues to S513 where a new state is set to a previous state based on the current state and the thermal indicator, for example, as indicated by TABLE 1. If the thermal indicator does not meet steps S510 and S512, the method continues to step S504. For example, if an error occurs or no temperature measurements meet a criteria associated with the state information of TABLE 1 the network device can return to receive one or more temperature measurements.

The method continues from either S512 or S513 to step S514 where the network device alters an operation of the network device based on the new state and an operation associated with the new state. At step S516, the network device can update the current state. For example, the network device sets the current to the new state of step S511 or step S513. The method continues to step 504 where one or more additional temperature measurements are received so as to determine a current temperature and so as to determine a thermal indicator using a subsequent temperature threshold associated with the current state (updated to the new state) so that a subsequent operation associated with the network device can be altered.

Figure 6:
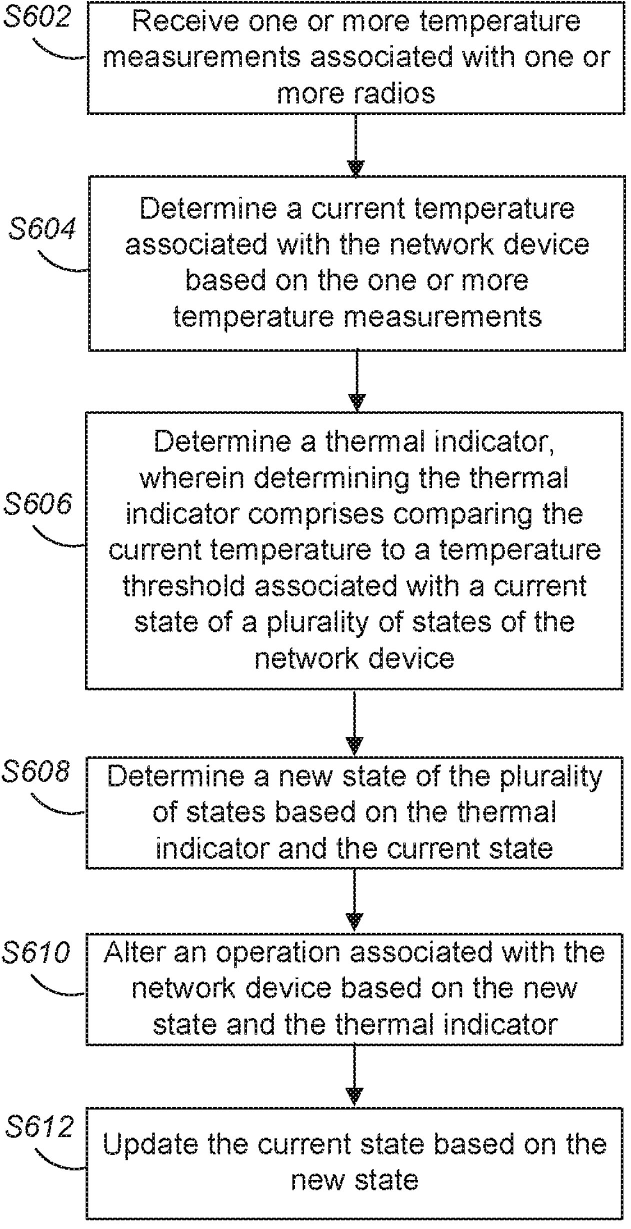
FIG. 6 is a flowchart illustrating a method for thermal management of a network device in a network environment, according to one or more aspects of the present disclosure.

FIG. 6 is a flowchart illustrating a method for thermal management of a network device in a network environment, according to one or more aspects of the present disclosure. At step S602, the network device receives one or more temperature measurements associate with the one or more radios. At step S604, the network device determines a current temperature associated with the network device based on the one or more temperature measurements from step S602.

At step S606, the network device determines a thermal indicator, wherein determining the thermal indicator comprises comparing the current temperature to a temperature threshold associated with a current state of a plurality of states of the network device, for example, based on state information from TABLE 1.

At step S608, the network device determines a new state of the plurality states based on the thermal indicator and the current state, for example, based on state information from TABLE 1.

At step S610, the network device alters an operation associated with the network device based on the new state and the thermal indicator, for example, using state information from TABLE 1. When the current state is state "A" and the thermal indicator is a "1", the new state is the next state (state "B") which is associated with an operation that comprises reducing a transmit duty cycle associated with at least one of the one or more radios. The at least one radio can be configured to only be allowed to transmit for certain percentage of time which reduces the transmit duty cycle to at least less than 100 percent. In one or more embodiments, the certain percentage of time is configurable. For a thermal indicator of "0", the new state is the previous state which remains state "A" and no operation is altered.

When the current state is state "B" and the thermal indicator is a "1", the new state is the next state (state "C") which is associated with an operation that comprises capping a transmit power of at least one of the one or more radios. Radio signal strength information (RSSI) can be collected for one or more network device connected to the at least one of the one or more radios and a maximum transmit power associated with at least one of the one or more radios can be reduced based on a lowest RSSI of the collected RSSI. For example, the lowest RSSI can be subtracted from a configurable floor threshold to determine a transmit power cap offset. As a first example, a current transmit power can be set to 22, a minimum transmit power set to 10, and a configurable floor set to −80. If the lowest RSSI is −72, the transmit power cap offset is 8 and the current transmit power will be reduced to the maximum transmit power minus the transmit power cap offset (20−8=14). If the lowest RSSI is −22, for example, then the current transmit power will be reduced to the minimum transmit power, in this example, 10. For a thermal indicator of "0", the new state is the previous state which is state "A" and the network device is reverted to the operation as indicated by the new state.

When the current state is "C" and the thermal indicator is a "1", the new state is the next state (state "D") which is associated with an operation that comprises limiting a number of RF chains associated with at least one of the one or more radios. For example, the network device can be configured to change from a N×N to a 2×2 or a 1×1 device based on the starting number of chains that are configurable. Power can be completely removed from any unused transmit and receive paths associated with the at least one of the one or more radios. This configuration can be made real-time. For a thermal indicator of "0", the new state is the previous state which can be state "A" or state "B" and the network device is reverted to the operation as indicated by the new state.

When the current state is "D" and the thermal indicator is a "1", the new state is the next state (state "E") which is associated with an operation that comprises removing one or more network devices connected to the network device. For example, at least one of the one or more network devices connected to the network device can be redirected to a different radio of the one or more radios (so that at least one radio can be shut-down) or a different network device. In one or more embodiments, all of the one or more network devices connected to the network device can be redirected or removed. In one or more embodiments, a recommendation can be received from a network resource (for example, based on IEEE 802.11 VMK and r) as to redirecting at least one of the one or more network devices to a different radio. The radio can send a deauthentication (DAuth) frame to the at least one of the one or more network devices. For a thermal indicator of "0", the new state is the previous state which can be any of state "A", state "B", or state "C" and the network device is reverted to the operation as indicated by the new state.

When the current state is "E" and the thermal indicator is a "1", the new state is the next state (state "F") which is associated with an operation that comprises shutting down an interface of at least one of the one or more radios. In one or more embodiments, all interfaces associated with all of the one or more radios are shut-down. In one or more embodiments, an interface can be shut-down for a predetermined period of time as an associated radio cannot transmit a temperature measurement while shut-down. After the predetermined period of time, the radio can be brought back up. For a thermal indicator of "0", the new state is the previous state which can be any of state "A", state "B", state "C", or state "D" and the network device is reverted to the operation as indicated by the new state.

When the current state is "F" and the thermal indicator is a "0", the new state is the previous state which can be any of state "A", state "B", state "C", state "D", or state "E" and the network device is reverted to the operation as indicated by the new state. In one or more embodiments, the network device transitions to each state of the plurality of states so as to perform thermal management of the network device.

At step S612, the current state is updated based on the new state. The current state can be set to the new state so that when one or more additional temperature measurements are received the above method steps are performed based on the new state.

In one or more embodiments, a network device may include a thermal management controller 29, that may be programmed with or to execute one or more instructions (for example, software or application 25) to perform steps for thermal management of the network device. In FIGS. 5-6, it is assumed that the network devices include their respective controllers and their respective software stored in their respective memories, as discussed above in reference to FIGS. 1-6, which when executed by their respective controllers perform the functions and operations in accordance with the example embodiments of the present disclosure.

The thermal management controller 29 can execute one or more computer-readable instructions, stored in a memory, for example, a memory 24 of an access point device 2, that when executed perform one or more of the operations of steps S502-S516 and/or steps S602-S612. In one or more embodiments, the one or more computer-readable instructions may be one or more software applications, for example, a software 25 of an access point device 2. While the steps of FIGS. 5 and 6 are presented in a certain order, the present disclosure contemplates that any one or more steps can be performed simultaneously, substantially simultaneously, repeatedly, in any order or not at all (omitted).

While ordinal states are discussed herein, in one or more embodiments the thermal management controller can transition from any one of the ordinal states discussed states discussed above, such as a current state, to another one of the ordinal states, such as a next state or a previous state, sequentially or in any order. In one or more embodiments, the thermal management controller alters a current operation of the network device associated with a current state prior to altering a next operation of the network device associated with a next state so as to alter each operation of the network device associated with each state prior to a shutting down the network device. In one or more embodiments, a comparison to a temperature threshold can comprise a determination that a value is less than (also referred to as below), equal to (also referred to as at), greater than (also referred to as above), less than or equal to, or greater than or equal to the temperature threshold.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A network device comprising: one or more radios; a memory storing one or more computer-readable instructions; and a processor configured to execute the one or more computer-readable instructions to: identify a current state of the network device, said current state being one of a plurality of operational states of said network device, each of said plurality of operational states being associated with at least one operation corresponding to an action to manage the temperature of the network device and a temperature threshold, each respective temperature threshold being one of a plurality of thresholds of increasing magnitude, and each of said operational states progressing in a series of increasing temperature thresholds; determine a current temperature associated with the network device based on one or more temperature measurements associated with the one or more radios; determine a thermal indicator, wherein determining the thermal indicator comprises comparing the current temperature to a temperature threshold associated with said current state of the network device; determine a new state of the plurality of states based on the thermal indicator and the current state, wherein said new state is the next operational state in said series when said thermal indicator indicates said current temperature is greater than the threshold temperature associated with the current state, and wherein said new state is a previous state when said thermal indicator indicates said current temperature is below another temperature threshold associated with said current state; alter an operation associated with the network device to modify power consumption of the network device based on the new state and the thermal indicator; and update the current state.

2. The network device of claim 1, wherein the processor is further configured to execute the one or more computer-readable instructions to:

determine the current temperature based on one or more additional temperature measurements;

update the current state based on the new state;

determine the thermal indicator, wherein determining the thermal indicator comprises comparing the current temperature to a subsequent temperature threshold associated with the current state;

determine the new state based on the thermal indicator and the current state; and alter a subsequent operation associated with the network device based on the new state and the thermal indicator.

3. The network device of claim 1, wherein altering the operation comprises:

reducing a transmit duty cycle associated with at least one of the one or more radios.

4. The network device of claim 1, wherein altering the operation comprises:

capping a transmit power for at least one of the one or more radios.

5. The network device of claim 1, wherein altering the operation comprises:

reducing a number of radio frequency (RF) chains associated with at least one of the one or more radios.

6. The network device of claim 1, wherein altering the operation comprises:

redirecting at least one of one or more network devices connected to the one or more radios to a different radio of the one or more radios or a different network device.

7. The network device of claim 1, wherein altering the operation comprises:

shutting down an interface associated with at least one of the one or more radios.

8. A method for controlling a temperature associated with a radio of a network device, the method comprising: identifying a current state of the network device, said current state being one of a plurality of operational states of said network device, each of said plurality of operational states being associated with at least one operation corresponding to an action to manage the temperature of the network device and a temperature threshold, each respective temperature threshold being one of a plurality of thresholds of increasing magnitude, and each of said operational states progressing in a series of increasing temperature thresholds; determining a current temperature associated with the network device based on one or more temperature measurements associated with the one or more radios; determining a thermal indicator, wherein determining the thermal indicator comprises comparing the current temperature to a temperature threshold associated with said current state of the network device; determining a new state of the plurality of states based on the thermal indicator and the current state, wherein said new state is the next operational state in said series when said thermal indicator indicates said current temperature is greater than the threshold temperature associated with the current state, and wherein said new state is a previous state when said thermal indicator indicates said current temperature is below another temperature threshold associated with said current state; altering an operation associated with the network device to modify power consumption of the network device based on the new state and the thermal indicator; and updating the current state.

9. The method of claim 8, further comprising:

determining the current temperature based on one or more additional temperature measurements;

updating the current state based on the new state;

determining the thermal indicator, wherein determining the thermal indicator comprises comparing the current temperature to a subsequent temperature threshold associated with the current state;

determining the new state based on the thermal indicator and the current state; and altering a subsequent operation associated with the network device based on the new state and the thermal indicator.

10. The method of claim 8, wherein altering the operation comprises:

reducing a transmit duty cycle associated with at least one of the one or more radios.

11. The method of claim 8, wherein altering the operation comprises:

capping a transmit power for at least one of the one or more radios.

12. The method of claim 11, wherein altering the operation comprises:

reducing a number of radio frequency (RF) chains associated with at least one of the one or more radios.

13. The method of claim 8, wherein altering the operation comprises:

redirecting at least one of one or more network devices connected to the one or more radios to a different radio of the one or more radios or a different network device.

14. The method of claim 8, wherein altering the operation comprises:

shutting down an interface associated with at least one of the one or more radios.

15. A non-transitory computer-readable medium of network device storing one or more computer-readable instructions, the one or more computer-readable instructions that when executed by a processor of the network device cause the network device to perform one or more operations comprising:

identifying a current state of the network device, said current state being one of a plurality of operational states of said network device, each of said plurality of operational states being associated with at least one operation corresponding to an action to manage the temperature of the network device and a temperature threshold, each respective temperature threshold being one of a plurality of thresholds of increasing magnitude, and each of said operational states progressing in a series of increasing temperature thresholds; determining a current temperature associated with the network device based on one or more temperature measurements associated with the one or more radios; determining a thermal indicator, wherein determining the thermal indicator comprises comparing the current temperature to a temperature threshold associated with said current state of the network device; determining a new state of the plurality of states based on the thermal indicator and the current state, wherein said new state is the next operational state in said series when said thermal indicator indicates said current temperature is greater than the threshold temperature associated with the current state, and wherein said new state is a previous state when said thermal indicator indicates said current temperature is below another temperature threshold associated with said current state; altering an operation associated with the network device to modify power consumption of the network device based on the new state and the thermal indicator; and updating the current state.

16. The non-transitory computer-readable medium of claim 15, wherein one or more further computer-readable instructions when executed by the processor cause the network device to perform one or more further operations comprising:

determining the current temperature based on one or more additional temperature measurements;

updating the current state based on the new state;

determining the thermal indicator, wherein determining the thermal indicator comprises comparing the current temperature to a subsequent temperature threshold associated with the current state;

determining the new state based on the thermal indicator and the current state; and altering a subsequent operation associated with the network device based on the new state and the thermal indicator.

17. The non-transitory computer-readable medium of claim 15, wherein altering the operation comprises at least one of:

reducing a transmit duty cycle associated with at least one of the one or more radios; and capping a transmit power for at least one of the one or more radios.

18. The non-transitory computer-readable medium of claim 15, wherein altering the operation comprises:

reducing a number of radio frequency (RF) chains associated with at least one of the one or more radios.

19. The non-transitory computer-readable medium of claim 18, wherein altering the operation comprises:

redirecting at least one of one or more network devices connected to the one or more radios to a different radio of the one or more radios or a different network device.

20. The non-transitory computer-readable medium of claim 15, wherein altering the operation comprises:

shutting down an interface associated with at least one of the one or more radios.

* * * * *